(12) United States Patent
Gonzalez Palacio Fenech

(10) Patent No.: US 8,657,599 B2
(45) Date of Patent: *Feb. 25, 2014

(54) DEVICE FOR DEMOULDING NEGATIVES IN PLASTIC INJECTION

(75) Inventor: Jose Luis Gonzalez Palacio Fenech, Barcelona (ES)

(73) Assignee: Progressive Components International Corporation, Wauconda, IL (US)

( * ) Notice: Subject to any disclaimer, the term of this patent is extended or adjusted under 35 U.S.C. 154(b) by 416 days.

This patent is subject to a terminal disclaimer.

(21) Appl. No.: 12/735,293

(22) PCT Filed: Nov. 27, 2008

(86) PCT No.: PCT/ES2008/070222
§ 371 (c)(1),
(2), (4) Date: Nov. 1, 2010

(87) PCT Pub. No.: WO2009/083630
PCT Pub. Date: Jul. 9, 2009

(65) Prior Publication Data
US 2011/0045122 A1    Feb. 24, 2011

(30) Foreign Application Priority Data
Dec. 31, 2007    (ES) .................................. 200703497

(51) Int. Cl.
*B29C 45/44* (2006.01)
(52) U.S. Cl.
USPC ..................... 425/556; 425/577; 425/DIG. 58
(58) Field of Classification Search
USPC ...... 425/556, DIG. 58, 577, 436 R, 441, 444, 425/436 RM; 264/334
See application file for complete search history.

(56) References Cited

U.S. PATENT DOCUMENTS

| | | | | |
|---|---|---|---|---|
| 3,642,417 A | * | 2/1972 | Von Holdt | 425/443 |
| 3,865,529 A | * | 2/1975 | Guzzo | 425/556 |
| 5,217,731 A | * | 6/1993 | Fallent | 425/556 |
| 5,281,127 A | * | 1/1994 | Ramsey | 425/556 |
| 5,281,385 A | * | 1/1994 | Julian | 264/318 |
| 5,316,467 A | * | 5/1994 | Starkey | 425/438 |
| 5,551,864 A | * | 9/1996 | Boskovic | 425/556 |

(Continued)

FOREIGN PATENT DOCUMENTS

EP    1 674 235 A1    6/2006
ES    2 135 182    10/1999

(Continued)

OTHER PUBLICATIONS

"Compact Standard Housing Lifter", spec sheet, www.pcs-company.com published prior to Jun. 30, 2010, possibly published Jan. 2007.

*Primary Examiner* — Yogendra Gupta
*Assistant Examiner* — Emmanuel S Luk
(74) *Attorney, Agent, or Firm* — Pauley Petersen & Erickson

(57) ABSTRACT

A device for demolding negatives in plastic injection, which is coupled to means for ejecting a plastic injection mold. A guide bushing can be attached to the die plate of the moveable part of the mold, inside which extends a counter-mold which molds the negative and is formed by a guide runner and a head that can be lowered to demold the negative. The guide bushing contains a projection which pushes against the side of the head as the counter-mold moves forward, so that the head is lowered sideways and the negative is released.

15 Claims, 4 Drawing Sheets

(56) References Cited

U.S. PATENT DOCUMENTS

| | | | |
|---|---|---|---|
| 5,773,048 A * | 6/1998 | Ramsey | 425/556 |
| 5,814,357 A * | 9/1998 | Boskovic | 425/556 |
| 5,879,611 A * | 3/1999 | Takahashi et al. | 264/275 |
| 6,491,513 B1 * | 12/2002 | Schneider | 425/577 |
| 6,749,420 B2 * | 6/2004 | Navarra Pruna | 425/556 |
| 7,435,079 B2 * | 10/2008 | Wang et al. | 425/577 |
| 8,168,108 B2 * | 5/2012 | Brown et al. | 264/318 |
| 8,226,404 B2 * | 7/2012 | Sorimoto | 425/577 |
| 8,241,031 B2 * | 8/2012 | Starkey et al. | 425/556 |
| 2002/0048618 A1 * | 4/2002 | Pruna | 425/556 |
| 2004/0109913 A1 * | 6/2004 | Drees | 425/556 |
| 2006/0172038 A1 | 8/2006 | Funo et al. | |
| 2010/0278963 A1 * | 11/2010 | Ni et al. | 425/556 |
| 2011/0003027 A1 * | 1/2011 | Navarra Pruna | 425/556 |
| 2011/0020490 A1 * | 1/2011 | Starkey et al. | 425/556 |

FOREIGN PATENT DOCUMENTS

| | | |
|---|---|---|
| ES | 1 061 679 U | 3/2006 |
| ES | 1 061 680 U | 3/2006 |
| ES | 2 320 504 | 5/2009 |
| ES | 2 345 697 | 9/2010 |
| JP | 4319413 | 11/1992 |
| WO | WO 2009/083630 A1 | 7/2009 |

* cited by examiner

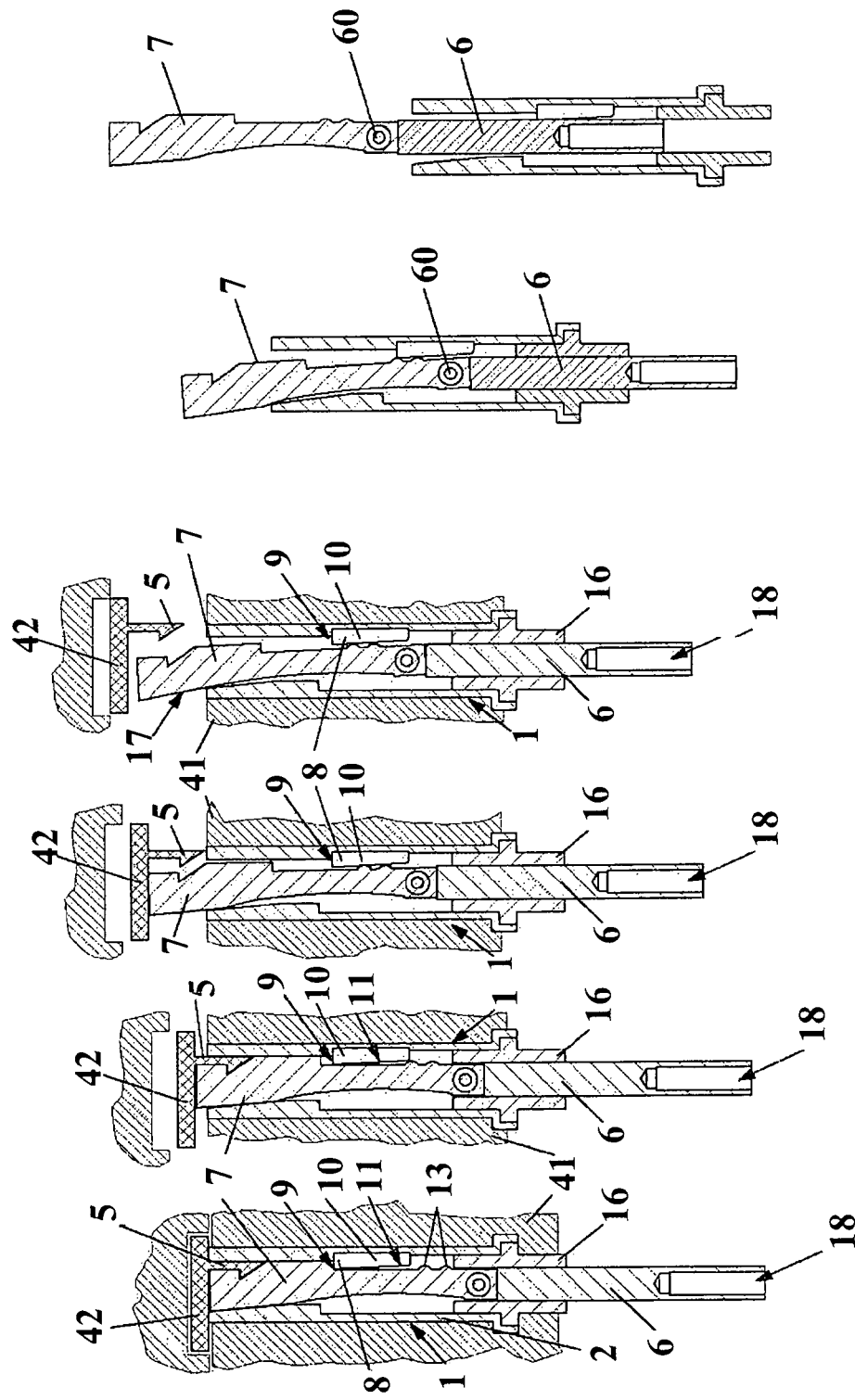

DEVICE FOR DEMOULDING NEGATIVES IN PLASTIC INJECTION

PURPOSE OF THE INVENTION

This is a device to demold negatives in plastic injection to prevent the appearance of burrs and to improve the demolding.

BACKGROUND FOR THE INVENTION

FIGS. 5 and 6 show a conventional mold for molding plastic pieces including a fixed part 40 and a movable part 41. A die plate is mounted to the fixed part 40 and another die plate is fixed to the moveable part 41. These two plates form the part or piece 42 to be molded. The moveable part 41 of the mold is closed against the fixed part 40 and forms a molding chamber between the two die plates.

The moveable part 41 of the mold is later separated from the fixed part 40, and the finished or molded piece 42 remains affixed to one of them, normally to the plate corresponding to the moveable part 41 of the mold. The piece 42 is removed using an ejection device or another suitable removal apparatus.

The molded pieces 42 are usually ejected using pins or stems which push the molded piece 42 out of the die plate. Pins or stems can emanate from an ejection plate 51 which is incorporated so that it floats about the moveable part 41 of the mold. When the ejection plate 51 moves then the pins move the molded piece 42 to be demolded.

In the plastic molding industry, the areas of the mold which do not have the same demolding direction as the remainder of the pieces are known as undercuts, negatives and/or voids. For example, a gripper 45 for the piece 42 cannot be demolded in the direction used to directly extract the piece 42, because it is buried in the piece 42.

For demolding, some movable counter-molds 4 move forward with the ejection plate 51 and also open on the sides. This opening or lateral movement releases the negative and allows the piece 42 to be ejected, extracted or removed, such as shown in FIGS. 5 and 6.

FIG. 5 shows a one embodiment of the counter-mold 4. The counter-mold 4 includes a rectangular or circular bar 47, which is laterally lowered to allow a lateral flexion and release the negative from the mold.

Another embodiment of the counter-mold 4 is shown in FIG. 6. The counter-mold 4 includes a cylindrical runner 6 and a collapsible head 7 articulated together. The articulation 50 allows the collapsible head 7 to move laterally and to release the negative.

One problem with the first prior art embodiment can occur if replacement is required due to breakage or wearing, because the entire element must be replaced which requires complete disassembly of the mold support plates as well as considerable time to machine the housing of the piece, which relates to costs.

The second prior art embodiment can have no problems but the adjustment for the two pieces forming the counter-mold is cylindrical with reduced conicity because the injection pressure for the plastic can change the position of the collapsible head 7, and thus cause a change in the geometry of the pieces, burrs, and the like. As the cylindrical part has a greater surface it needs to travel further to collapse the first piece.

Some of these problems are solved by an invention taught by Spanish Patent Application 200502882 which refers to a negative demolding system, and covers the layout of a spring between the runner and the head to improve its collapsibility, and the layout of a tilted lateral face in the collapsible head which relocates the head as it moves back into the bushing.

The invention of Spanish Patent Application 200502882 helps meet some objectives but this invention moves forward to meet other objectives with the development of an advantageous demolding system.

DESCRIPTION OF THE INVENTION

A device for demolding negatives in plastic injection molding according to this invention offers various advantages over other similar known systems.

According to this invention, the demolding device is coupled to a device or apparatus for ejecting a plastic injection mold, and includes a guide bushing that can be attached to the die plate of the moveable part of the mold, inside of which is a counter-mold that molds the negative. The counter-mold of some embodiments of this invention includes a guide runner and a collapsible head to demold the negative.

Inside the guide bushing there is a projection that pushes against the side of the head as the counter-mold moves forward, forcing it to collapse laterally and thereby releasing the negative.

In addition, the device of some embodiment of this invention also includes a stop located at the entry of the counter-mold, inside the guide bushing.

Thus, the head is forced to collapse, which prevents the molded piece from becoming stuck, and prevents it from collapsing.

Stopping the run of the counter-mold also prevents it from penetrating too far into the guide bushing as a result of the injection pressure, and thus prevents the appearance of resulting burrs.

BRIEF DESCRIPTION OF THE DRAWINGS

The above and other features and objects of this invention are better understood from the following detailed description when taken in view of the drawings, wherein:

FIG. 2 shows cross-sectional views of four different sequential steps of releasing a molded part, according to one embodiment of this invention;

FIG. 2a shows two different cross-sectional views illustrating how to extend a blade or head into a position that allows for disassembly of the blade or head;

DETAILED DESCRIPTION OF THE INVENTION

Figure 1:
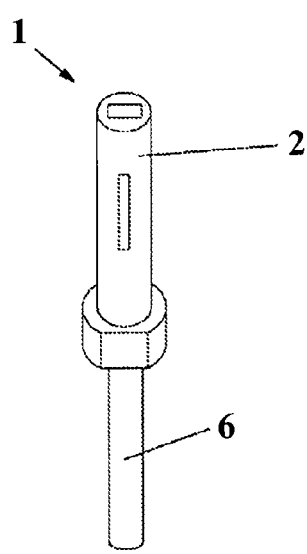
FIG. 1 is a perspective view of a general representation of a release device, not mounted in a corresponding mold part or piece, according to one embodiment of this invention.

As shown in FIGS. 1-4, the device 1 of this invention is used to demold negatives in plastic injection and is coupled to a device or apparatus for ejecting a plastic injection mold. The device 1 of this invention comprises a guide bushing 2 that can be attached to a die plate of the movable part 41 of the mold, inside which extends a counter-mold 4 that molds a negative 5.

Figures 3, 4:
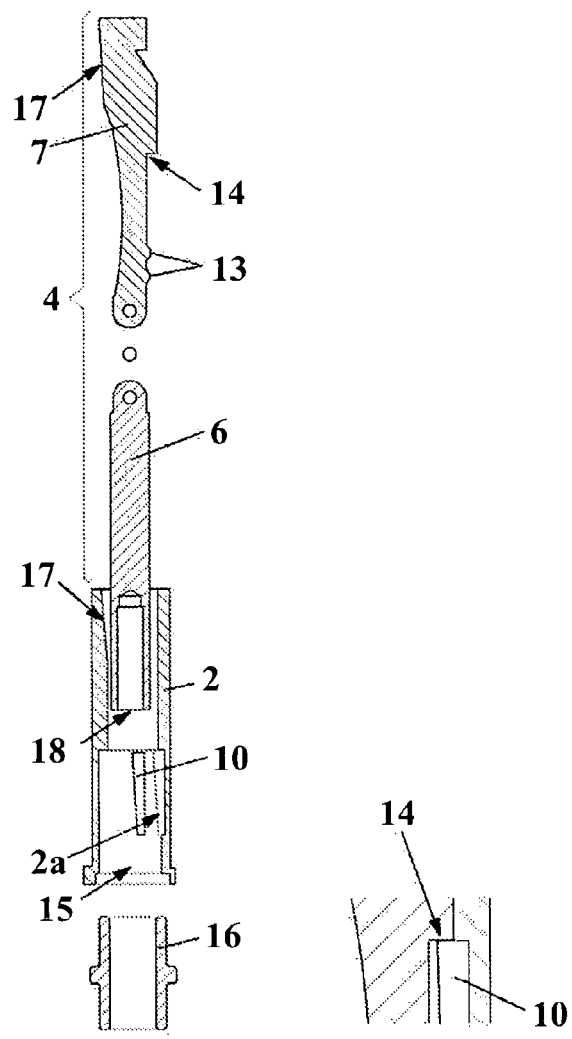
FIG. 3 shows a partial sectional view of a wedge element and a guide bushing, according to one embodiment of this invention.
FIG. 4 shows an exploded sectional view of a release device, according to one embodiment of this invention.

The counter-mold 4 shown in FIG. 4 comprises a guide runner or flange 6 and a collapsible head 7 which is articulated to the runner 6, and used to demold the negative 5. A suitable articulation between the head 7 and the runner 6 allows the head 7 to be disassembled from a front as the counter-mold moves forward so that the pin 60, which can form the articulation, is accessible, such as shown in FIG. 2a. This feature can prevent having to dismount the complete mold support plates when the head 7 is replaced, such as from wear or for other replacement reasons.

Inside the guide bushing 2 is a projection 8 which pushes against the side of the head 7 as the counter-mold 4 moves forward, and thus forces the head 7 to collapse laterally and release the negative 5, according to the sequence shown in FIG. 2.

Similarly, a stop 9 positioned inside the guide bushing 2 can stop the counter-mold 4 from entering the guide bushing 2, in order to stop its run and also to eliminate burrs on the molded piece 42.

In the embodiment shown in FIGS. 1-4, the projection 8 and the stop 9 are formed by a single element or piece 10, which can be removed for machining, and can fit into some internal housings 2a of the guide bushing 2, such as shown in FIG. 4.

The guide bushing 2 forms a chamber 15 which is broad enough to position the piece 10 inside, in the housings 2a. This chamber is closed by an axial guide 16, through which the runner or flange 6 runs.

The piece 10 can have a tilted longitudinal runner 11 which pushes against the side of the head 7, as well as a transverse upper step 12 which forms the stop 9. The head 7 can form lateral protuberances 13 that are able to contact with the step 11, as well as a chock 14 that is in contact with the stop 9.

Figure 5:
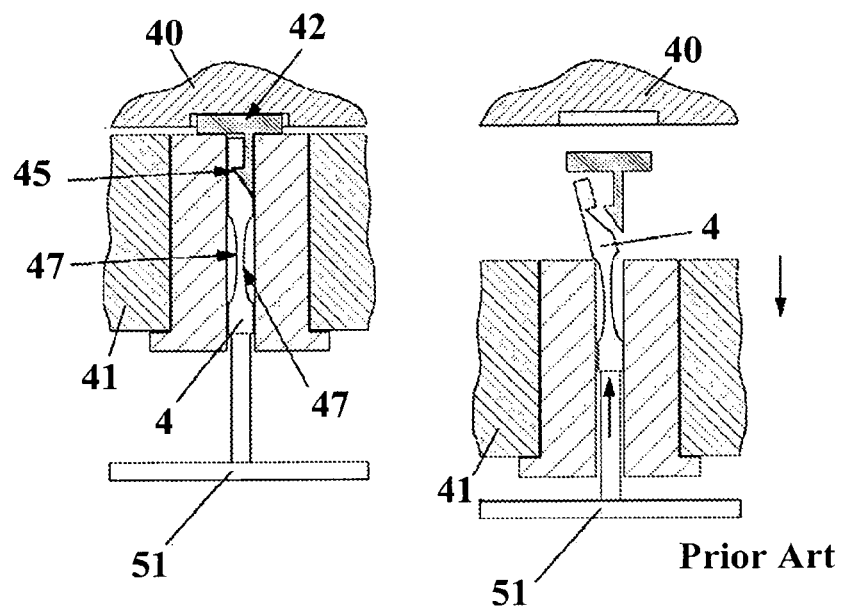
FIG. 5 shows two partial sectional views, each of a different position of a fixed part and a moveable part of a mold system, as known in the prior art.
Figure 6:
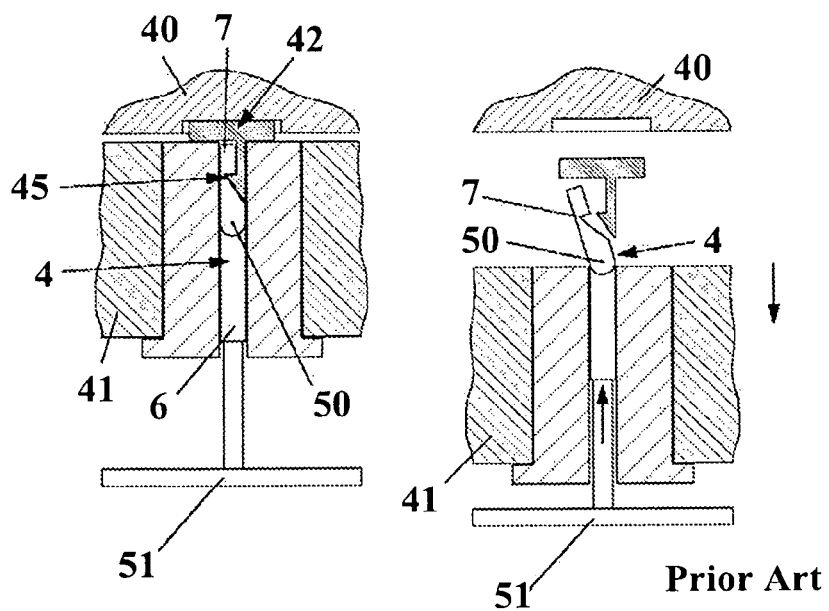
FIG. 6 shows two partial sectional views, each of a different position of a fixed part and a moveable part, according to another known prior art molding system.

The head 7 and the end of the guide bushing 2 where the head 7 is located can have an increased section towards a free end, for example to immobilize the counter-mold 4 as the lateral support of the head 7 in that section of the guide bushing 2 prevents the head 7 from continuing to penetrate, such as due to the plastic injection pressure. This geometry also allows the head 7 to collapse laterally with a lower ejection run, in comparison with the totally cylindrical known counter-molds 4, such as those shown in FIGS. 5 and 6. The increase in the head section 7 and the end of the guide bushing 2 can result in a flat inclined face 17 with which both contact.

In some embodiments of this invention, a hole or holes 18 at the lower ends of each runner 6 can be used to affix the runner 6 to the ejection device.

The invention claimed is:

1. An apparatus for demolding negatives in plastic injection molding, the apparatus comprising an ejector for ejecting a plastic injection mold, a guide bushing (2) attachable to a die plate on a movable part (41) of a mold, inside which a counter-mold (4) extends which molds a negative (5) formed of a guide runner (6) and a collapsible head (7) to demold the negative (5), inside the guide bushing (2) a projection (8) pushing against a side of the head (7) as the counter-mold (4) moves forward to force the head (7) to laterally collapse and to release the negative (5), inside the guide bushing (2) a stop (9) being positioned to prevent entry by the counter-mold (4), for limiting a run and eliminating burrs in a molded piece, and the projection (8) and the stop (9) forming a single removable piece (10) which fits into housings (2a) inside the guide bushing (2).

2. The apparatus for demolding according to claim 1 wherein the guide bushing (2) provides a chamber (15) with the housings (2a).

3. The apparatus for demolding according to claim 2 wherein the guide bushing (2) provides an axial guide (16) closing the chamber (15) and through which runs the guide runner (6).

4. The apparatus for demolding according to claim 3 wherein a piece (10) presents an inclined longitudinal runner (11) which pushes against the side of the head (7), and an upper transversal step (12) which forms the stop (9).

5. The apparatus for demolding according to claim 4 wherein the head (7) has lateral projections (13) which contact the runner (11), and a chock (14) which contacts the, stop (9).

6. The apparatus for demolding according to claim 5, wherein the head (7) and an end of the guide bushing (2) where housed increase in section towards a free end for immobilizing the counter-mold (4) and allowing lateral collapse of the head (7).

7. The apparatus for demolding according to claim 6 wherein the section is increased by a flat inclined face (17).

8. The apparatus for demolding according to claim 7 wherein the runner (6) has holes (18) to fix the ejector.

9. The apparatus for demolding according to claim 8 wherein the head (7) is connected to the runner (6) by a pin (60) accessible when the mold moves forward to allow the head (7) to be disassembled from a front.

10. The apparatus for demolding according to claim 2 wherein a piece (10) presents an inclined longitudinal runner (11) which pushes against the side of the head (7), and an upper transversal step (12) which forms the stop (9).

11. The apparatus for demolding according to claim 1 wherein a piece (10) presents an inclined longitudinal runner (11) which pushes against the side of the head (7), and an upper transversal step (12) which forms the stop (9).

12. The apparatus for demolding according to claim 1, wherein the head (7) and an end of the guide bushing (2) where housed increase in section towards a free end for immobilizing the counter-mold (4) and allowing lateral collapse of the head (7).

13. The apparatus for demolding according to claim 12 wherein the section is increased by a flat inclined face (17).

14. The apparatus for demolding according to claim 1 wherein the runner (6) has holes (18) to fix the ejector.

15. The apparatus for demolding according to claim 1 wherein the head (7) is connected to the runner (6) by a pin (60) accessible when the mold moves forward to allow the head (7) to be disassembled from a front.

* * * * *